United States Patent [19]
Li et al.

[11] Patent Number: 5,430,620
[45] Date of Patent: Jul. 4, 1995

[54] COMPACT SURGICAL ILLUMINATION SYSTEM CAPABLE OF DYNAMICALLY ADJUSTING THE RESULTING FIELD OF ILLUMINATION

[75] Inventors: Kenneth Li, Arcadia; Steven Murray, Menlo Park; Zafirios Gourgouliatos; Douglas M. Brenner, both of Los Angeles, all of Calif.

[73] Assignee: Cogent Light Technologies, Inc., Santa Clarita, Calif.

[21] Appl. No.: 134,262

[22] Filed: Oct. 8, 1993

[51] Int. Cl.$^6$ .............................................. F21V 8/00
[52] U.S. Cl. ...................................... 362/32; 362/105; 362/277; 362/319; 362/343; 362/804
[58] Field of Search ............... 128/18, 22, 23; 362/32, 362/187, 188, 277, 280, 319, 343, 804, 103, 105, 106

[56] References Cited

U.S. PATENT DOCUMENTS

| | | | |
|---|---|---|---|
| D. 300,868 | 5/1993 | Conforti | D26/39 |
| 608,109 | 7/1898 | Dow | 362/188 |
| 3,285,242 | 11/1966 | Wallace | 128/23 |
| 3,830,230 | 8/1974 | Chester | 128/23 |
| 3,951,139 | 4/1976 | Kloots | 128/23 |
| 3,959,612 | 5/1976 | Feinbloom | 200/11 R |
| 4,234,910 | 11/1980 | Price | 362/32 |
| 4,274,128 | 6/1981 | Malis | 362/105 |
| 4,428,031 | 1/1984 | Mori | 362/277 |
| 4,454,568 | 6/1984 | Stadnik | 362/280 |
| 4,516,190 | 5/1985 | Kloots | 362/32 |
| 4,616,257 | 10/1986 | Kloots et al. | 358/93 |
| 4,757,431 | 7/1988 | Cross et al. | 362/261 |
| 4,916,579 | 4/1990 | Simms | 362/187 |
| 5,268,977 | 12/1993 | Miller | 362/32 |

*Primary Examiner*—Ira S. Lazarus
*Assistant Examiner*—Alan B. Cariaso

*Attorney, Agent, or Firm*—Blakely, Sokoloff, Taylor & Zafman

[57] ABSTRACT

The present invention provides a compact surgical headlamp capable of dynamic adjustment of the resulting field of illumination, comprising at least a single core fiber optic delivery light guide, an adjustable light projection system, and a mounting mechanism for movably supporting the headlamp proximate to the surgeon's eyes. A receiving block is also provided for supporting the structure of the projection system and for coupling the delivery fiber thereto. The projection system comprises a cylindrical housing mount adapted with a centrally disposed cylindrical cavity for receiving the ferruled, output end of the delivery fiber and for allowing the light output therefrom to initially diverge within the cavity of the housing mount. An outside surface of the housing mount is threaded for screwable reception of a correspondingly threaded, cylindrical lens housing, with a field lens disposed at a distal end of the lens housing such that the lens is movable back and forth along the optical axis of the delivery fiber by screwing the lens housing on and off of the housing mount. The enclosed cavity collects the more divergent light rays and redirects them toward the output endface of the lens so as to produce a concentrated light beam which defines a smaller solid angle of divergence. As a result, a brighter field of illumination is achieved through movement of the lens towards the protracted position where the illuminated field is made smaller. The mounting mechanism comprises a ball and socket joint coupled at one end to a lower corner of the receiving block, and at a second end to a bracket which can easily be attached to an annular head mount for detachable insertion of the head mount into a headband worn by a surgeon.

25 Claims, 5 Drawing Sheets

$df = \dfrac{WD}{M+1}$

COMPACT SURGICAL ILLUMINATION SYSTEM CAPABLE OF DYNAMICALLY ADJUSTING THE RESULTING FIELD OF ILLUMINATION

BACKGROUND OF THE INVENTION

1. Field of the Invention

The present invention is related to the field of fiber optics, and more particularly to the use of fiber optic delivery light guides and projection systems in surgical illumination systems including headlamps worn by a surgeon.

2. Prior Art

Surgical illumination systems provide a means for delivering visible light to the surgical working field. They are used both as stand-alone units that simply provide a fixed field of illumination and in conjunction with magnification systems such as surgical loupes. Ideally, the beam of light forming a field of illumination on a plane normal to the central axis of the light beam positioned at the surgical field should be coaxial with the surgeon's field of view. To achieve this condition, illumination systems may be either stationary or movable in position, and the size of the illuminated field may be either fixed or adjustable. Stationary illumination systems having a fixed illumination field are desirable when the field of view is fixed as with the use of surgical loupes having constant magnification. When the magnification of the illumination field is adjustable, then an adjustable beam diameter is required. If the illumination system is used as a stand-alone unit, variation in both the position and beam diameter is desirable to accommodate different surgical fields.

Illumination systems generally consist of three main components: (i) a delivery light guide, (ii) a light-projection system, and (iii) a mounting mechanism. In prior art systems, the light delivery cable forms a bundle of fiber optics coupled between a light source and the illumination system. The use of a fiber optic bundle as the delivery cable is required because of the constraints imposed by conventional illumination systems in the coupling of light from the source into a small target such as the collection endface of the cable. Use of a bundle of fibers having a relatively large combined diameter of typically 3–5 mm is required to enable an adequate amount of light to be coupled into the delivery cable so as to illuminate the surgical field with a sufficient amount of light.

The light-projection system of prior art illumination systems can be grouped into two general categories: those that involve a direct coupling between the output end of the delivery cable and a lens, and those that involve a compound coupling where a turning mirror and/or lens is disposed between the output end of the fiber and the lens to direct the light to the lens. In a headlamp having compound coupling projection system, such as the one disclosed in Kloots U.S. Pat. No. 4,516,190, adjustment of the beam diameter, and hence the resulting field of illumination, is controlled by means of an adjustable aperture such as an iris placed in the path of the light beam. In order to reduce the size of the illuminated field, the diameter of the iris' aperture must be proportionately reduced, which in turn also attenuates the light output from the system proportionate to the size of the illuminated field.

The mounting system of a headlamp is typically a headband to which is attached a variety of clamps, brackets, hinges, pivot mechanisms and the like for mounting and positioning of the projection system. For example, in one prior art headlamp (Chester U.S. Pat. No. 3,830,230), the light projection system is connected to a headband via two rotation joints coupled together by a pivot member that permits planar rotation of the headlamp about the headband.

Although surgical illumination systems have been in use for many years, each of the three components of prior art designs have a number of disadvantages. One disadvantage of the fiber optic bundle delivery light guide is its weight, which causes fatigue to the neck of the surgeon during use of the headlamp. In some designs, an attempt has been made to reduce the drag of the bundle by bifurcating it so as to provide greater balance of the mounting assembly on the surgeon's head. Another disadvantage of fiber optic bundles is that the length of the delivery cable is rather limited because the loss of light per unit length is quite high, ranging from 10 to 15% per foot. The longer the cable, the less light available to the surgeon, thereby requiring shorter lengths of cable for larger diameter bundles. In practice, a delivery cable made from a fiber optic bundle having a diameter of 5 mm should not be longer than 10 feet. Hence, this requirement significantly restricts the surgeon's freedom of movement since by the time the cable is attached to the surgeon's gown, very little length remains for the surgeon to .move around the operating table.

The projection systems of conventional headlamps, both direct and compound couplings, also have disadvantages. Due to the relatively large diameter of the bundle, a directly coupled lens must have a sufficiently large aperture so as not to limit the transmitted light. Moreover, because of the size of the beam output from the cable, it is difficult to create a beam that is approximately collimated and coaxial when using a single lens system. However, when using a projection system having a compound coupling, the system then becomes quite bulky and less efficient in delivering the light from the bundle to the illumination field. The decreased efficiency results in noticeable heating of the housing of the projection system. However, the compound system tends to provide a superior quality of light, characterized as being more uniform, collimated, and coaxial. Most importantly, because of the combined inefficiencies of the above-described conventional delivery cables and projection systems, the total amount of light deliverable to the surgical field is often less than what would otherwise be desirable.

With respect to the mounting mechanisms used to support the projection systems of conventional headlamps, although many different variations exist, all of them create a bulky headband of noticeable weight. In addition, since it is a requirement that the headlamp be fixed in position after its initial adjustment, the headband itself must be secured to the surgeon's head so as to prevent any movement. Typical designs in use today consist of a circular ring adjustable in circumference to adjust the fit, with an additional support member curved over the head for supporting the delivery cable. The disadvantage of this design, aside from weight, is that it must fit rather tightly around the head to prevent any movement such that it becomes uncomfortable during lengthy surgical procedures.

Accordingly it is an object of the present invention to provide a very compact and light-weight surgical illumination system which has all the functionality of conventional illumination systems, but provides significantly improved comfort for the surgeon during its use and more versatility in the manner in which it is mounted.

It is another an object of the present invention to provide superior illumination quality of the illuminated field in both light intensity and uniformity by supplying light to a projection system through a single core fiber optic which is substantially lighter than a fiber bundle, thereby affording more freedom of movement to the surgeon while preventing fatigue.

It is yet another object of the present invention to provide a surgical illumination system having a projection system comprising a single fiber delivery light guide directly coupled to a movable field lens through use of a simple screw mechanism which is very compact and provides better illumination for smaller fields of illumination by concentrating the light beam output from the delivery fiber and conserving the total power of the transmitted light.

It is a further object of the present invention to provide a nearly collimated light beam, coaxial with the surgeon's line of sight through use of a mounting mechanism which permits the projection system to be advantageously placed between the eyes of the surgeon without hindering his sight.

SUMMARY OF THE INVENTION

The present invention provides a compact surgical illumination system or headlamp capable of dynamic adjustment of the resulting field of illumination. The surgical illumination system comprises at least a single fiber delivery light guide, an adjustable light projection system, and a mounting mechanism for movably supporting the illumination system proximate to the surgeon's eyes. A receiving block is also provided for supporting the structure of the projection system and for coupling the delivery fiber thereto. The delivery fiber is removably connected to the receiving block by means of inserting the output end of the fiber through a ferrule, inserting the ferruled end of the fiber through a cylindrical passage and tightening a screw clamp (or bayonet fitting) around the ferrule to fixedly hold the fiber in place. The delivery light guide comprises a single optical fiber having a high light transmission efficiency comprising a quartz core having a diameter of 0.48 mm, a cladding consisting of an amorphous fluorocarbon comprising a 1,3-DIOXOLE,4,5-DIFLUORO,2,2-BIS(TRIFLUOROMETHYL)-POLYMER with TETRAFLUOROETHENE, and a silicone buffer.

The projection system controls the angular divergence of the output light beam, and hence, the size of the resulting field of illumination. The projection system comprises a cylindrical housing mount adapted with a centrally disposed cylindrical cavity for receiving the ferruled, output end of the delivery fiber and for allowing the light output therefrom to initially diverge within the cavity of the housing mount. An outside surface of the housing mount is threaded for screwable reception of a correspondingly threaded, cylindrical lens housing. Alternatively, the surfaces of the housing mount and the housing may be made smooth to permit the system to be slid back and forth without rotation. At a first end of the lens housing opposite to the housing mount, a receptacle for the field lens is formed by providing a seat for the lens. With this construction, the lens is movable back and forth along the optical axis of the output end of the delivery fiber by screwing or sliding the lens housing on and off of the housing mount.

The output end of the delivery fiber is fixedly positioned at an insertion point within the cavity of the housing mount defined by the point at which the entire solid angle of divergence of the light beam output from the fiber fills the entire output endface of the field lens when the system is in the retracted position. In the retracted position, the size of the field of illumination projected on the surgical working area is at a maximum since the light exiting the output endface of the lens is allowed to completely fill the solid angle of divergence of the particular delivery fiber selected. When the system is moved to the protracted position, the size of the field of illumination is at a minimum since not all the light exiting the delivery fiber is initially incident upon the output endface of the field lens.

As the lens is moved to the protracted position, the collection efficiency of light in the housing is proportionately reduced but the total illuminated area is made much smaller due to the focusing power of the lens, thereby significantly increasing the overall light intensity of the smaller illuminated fields. As a result, a brighter field of illumination is achieved by the present invention through movement of the lens towards the protracted position where the illuminated field is made smaller. Additionally, various optics (i.e. filters or polarizers) can be implemented within the cavity defined by the housing mount so as to better collect and concentrate the light rays exiting the output end of the single delivery fiber. Because the present invention combines the above-described projection system with a single fiber delivery light guide which efficiently transmits light from a high intensity source to the surgical illumination system, the size and weight of the surgical illumination system is minimized.

The mounting mechanism comprises a ball and socket joint coupled to a lower corner of a generally rectangular receiving block by means of a rigid post affixed therebetween. Attachment of a joystick enables control of the exact position of the illumination system so as to properly position the output light beam. The ball and socket joint is preferably affixed to a bracket which can easily be attached to an annular head mount for detachable insertion of the annular head mount into headbands regularly worn by surgeons. The receiving block may further take on various shapes and positions in order to minimize bending of the delivery fiber at its connection to the receiving block and/or to provide a coaxial arrangement between the surgeon's field of view and the field of illumination.

BRIEF DESCRIPTION OF THE DRAWINGS

The objects, features and advantages of the present invention will become apparent from the following detailed description in which.

DETAILED DESCRIPTION OF THE INVENTION

The present invention provides a compact surgical illumination system, in the form of both a headlamp worn by a surgeon and a separate unit used remotely from the surgeon, capable of dynamic adjustment of the resulting field of illumination. In the following description, for purposes of explanation and not limitation, specific details are set forth, such as particular dimensions, distances, optical components, etc. in order to provide a thorough understanding of the present invention. However, it will be apparent to one skilled in the art that the present invention may be practiced in other embodiments that depart from these specific details. In other instances, descriptions of well-known elements, features and techniques are omitted so as not to obscure the description of the present invention with unnecessary detail.

Figure 1A:
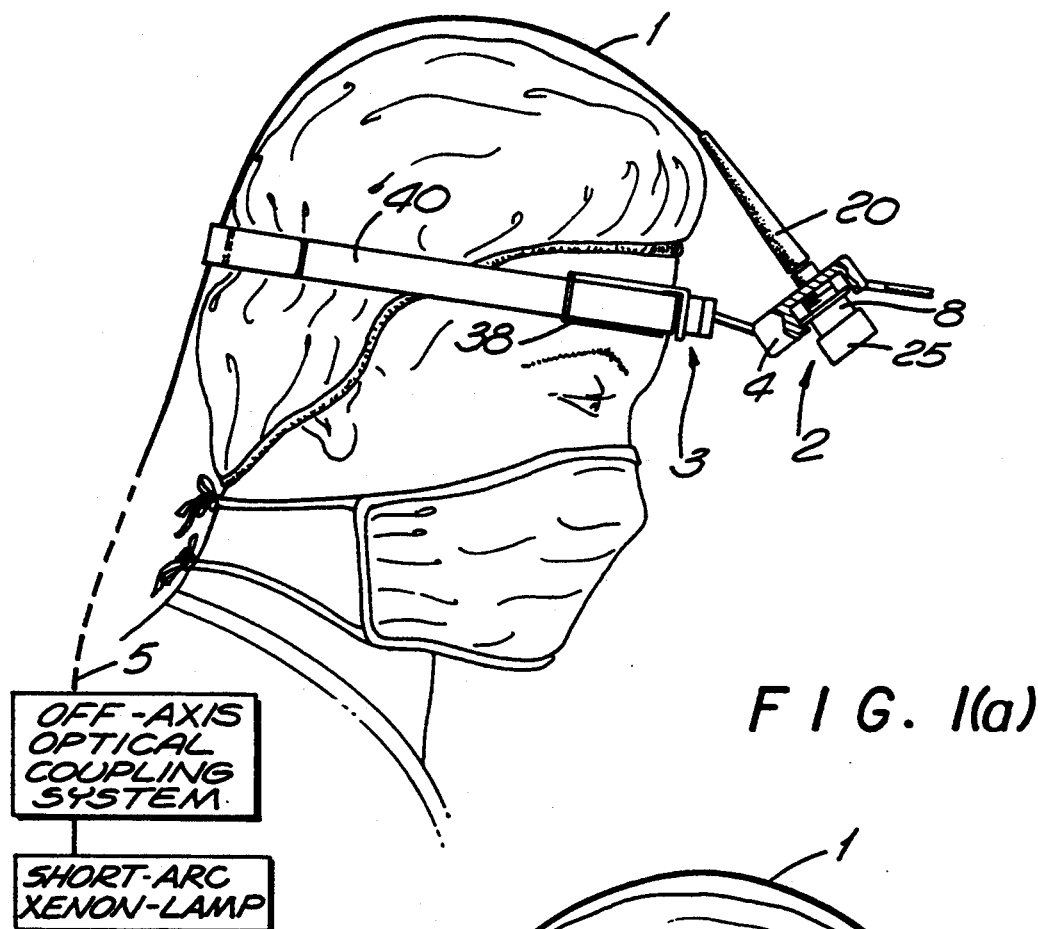
FIG. 1(a) is a side elevational view of a first embodiment of the surgical illumination system of the present invention, showing its attachment to a headband worn by a surgeon.
Figure 1D:
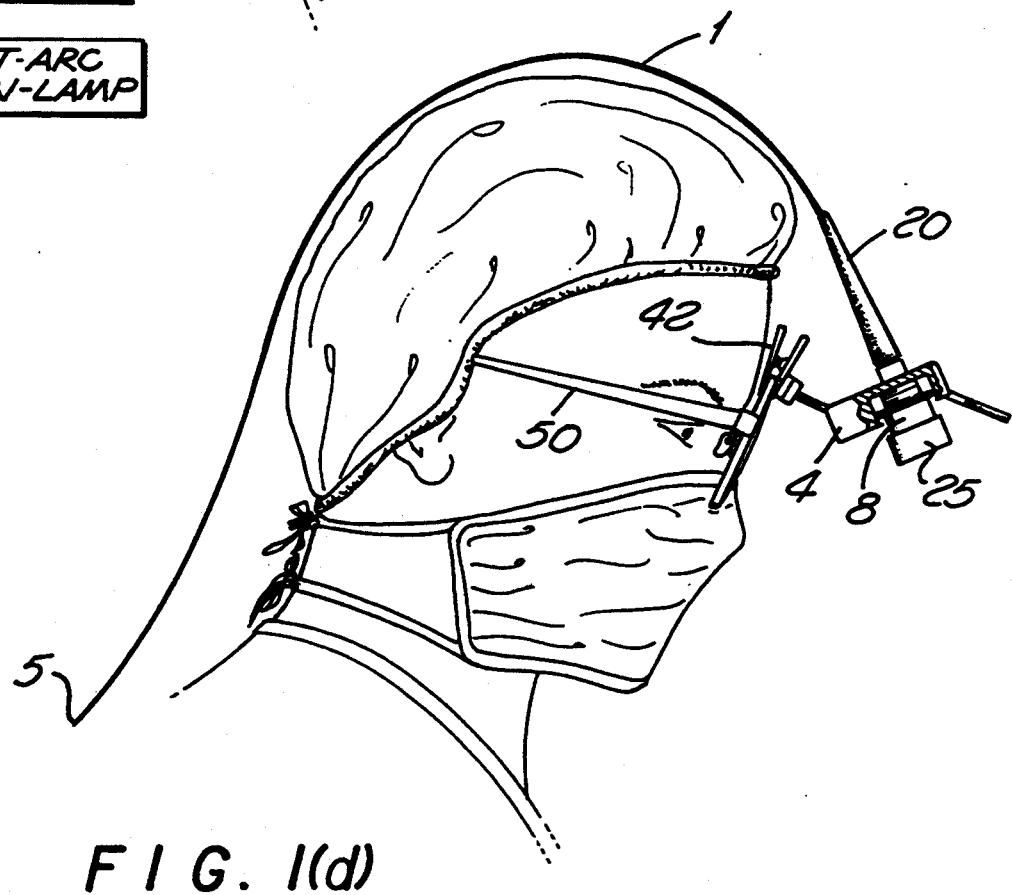
FIG. 1(d) is a side elevational view of the first embodiment of the surgical illumination system of the present invention, showing its attachment to a clip on a spectacle or loupe worn by a surgeon.
Figure 1B:
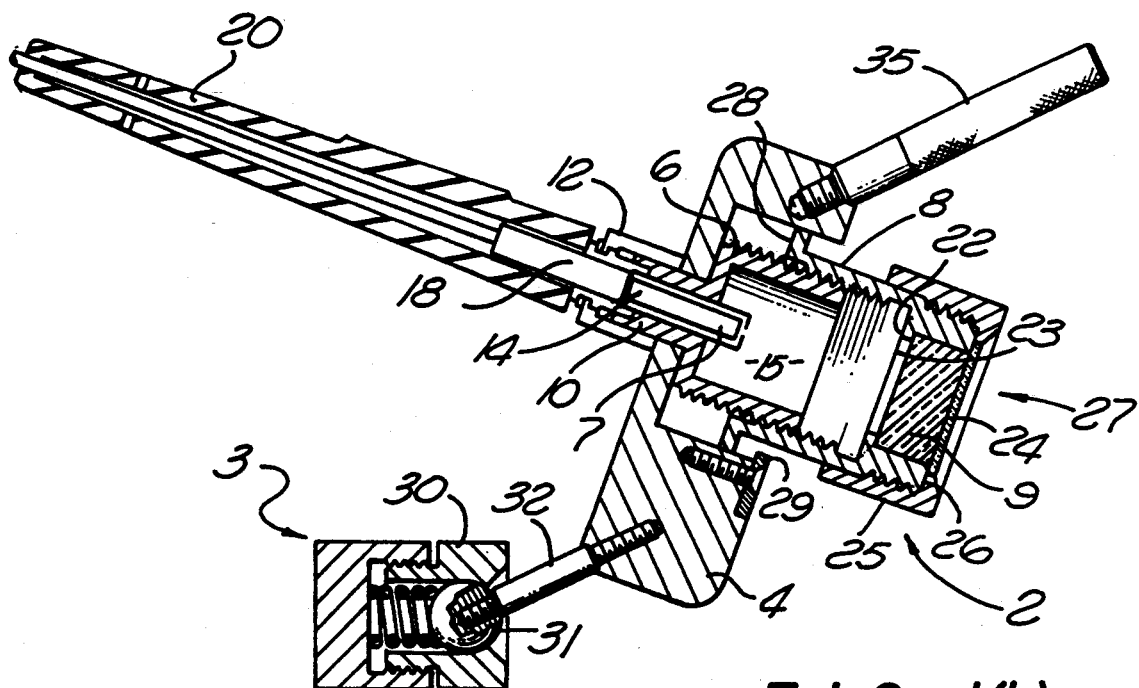
FIG. 1(b) is a cross-sectional view of the first embodiment of the surgical illumination system of the present invention, showing the projection system in the protracted position.
Figure 1C:
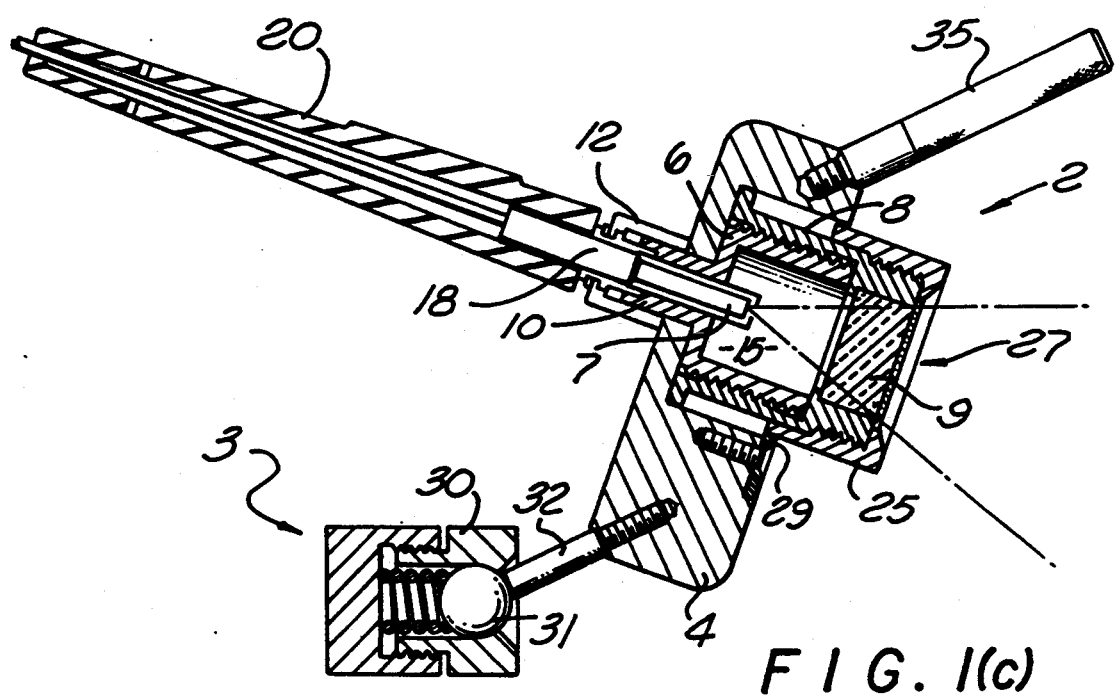
FIG. 1(c) is a cross-sectional view of the first embodiment of the surgical illumination system of the present invention, showing the projection system in the retracted position.
Figure 2A:
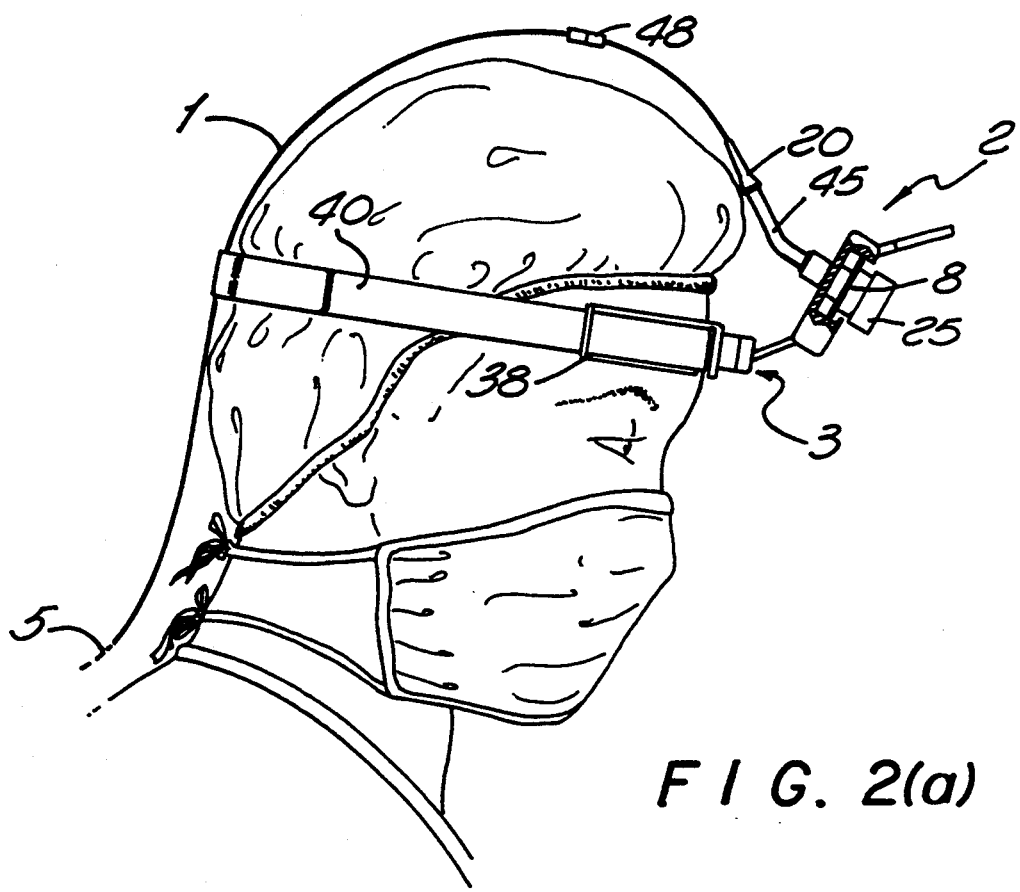
FIG. 2(a) is a side elevational view of a second embodiment of the surgical illumination system of the present invention, showing its attachment to a headband worn by a surgeon.
Figure 2B:
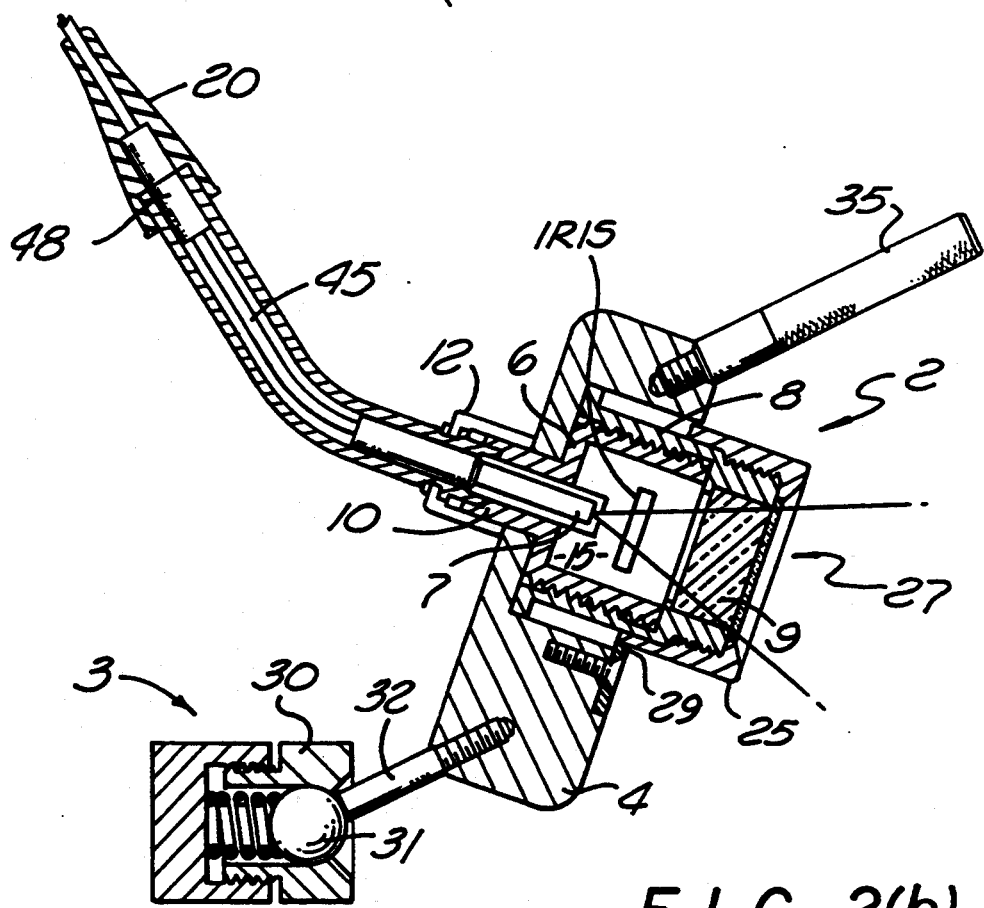
FIG. 2(b) is a cross-sectional view of the second embodiment of the surgical illumination system of the present invention.
Figure 3A:
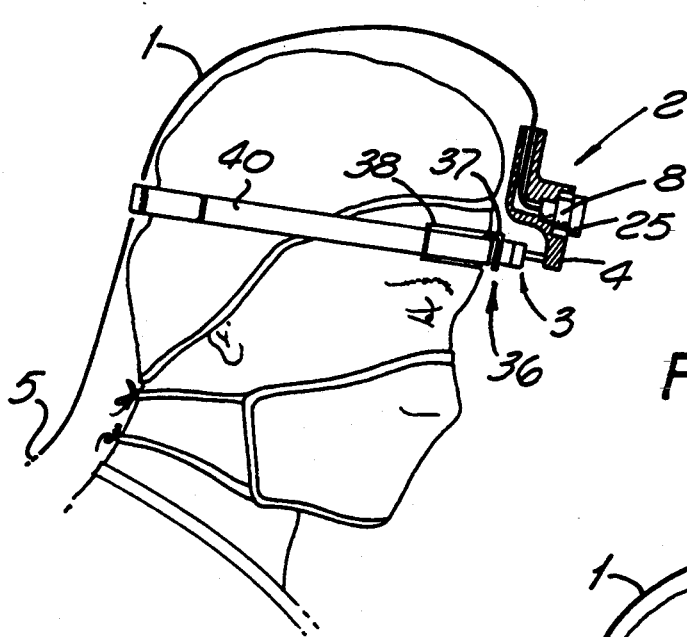
FIG. 3(a) is a side elevational view of a third embodiment of the surgical illumination system of the present invention, showing a first means of attachment of the illumination system to a headband worn by a surgeon.
Figure 3B:
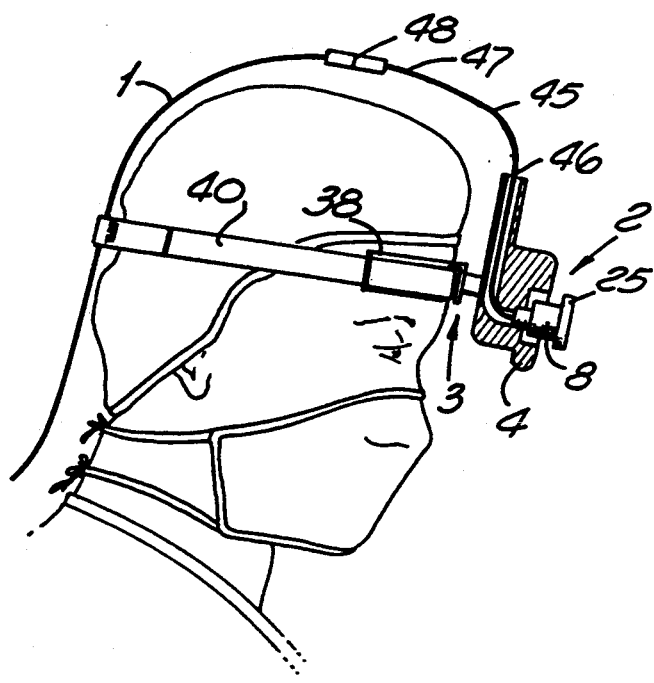
FIG. 3(b) is a side elevational view of the third embodiment of the surgical illumination system of the present invention, showing a second means of attachment of the illumination system to a headband worn by a surgeon.
Figure 3C:
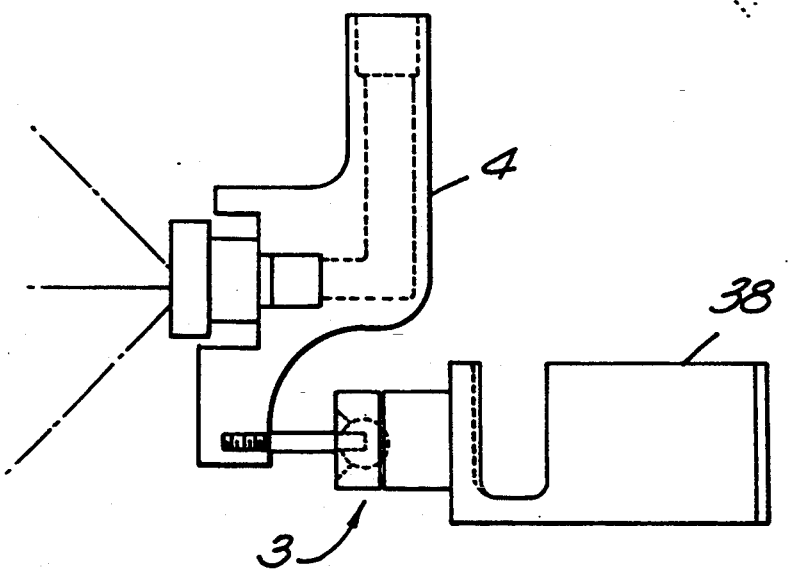
FIG. 3(c) is a cross-sectional view of the third embodiment of the surgical illumination system of the present invention, showing attachment of the mounting mechanism to a bracket.

In accordance with the present invention, as shown in FIGS. 1-3, the surgical illumination system comprises at least three main elements: (1) a single fiber optic delivery light guide 1 (also referred to as the "delivery fiber"), (2) an adjustable light projection system 2, and (3) a mounting mechanism 3 for movably supporting the illumination system either proximate to the surgeon's eyes or distant from the surgeon. (For example, the illumination system may be attached to a headband, a pair of glasses or surgical loupes worn by the surgeon, or mounted from the ceiling or a wall of an operating room, to an instrument tray or the like). A receiving block 4 is further provided for supporting the structure of the projection system 2 and for coupling the delivery fiber 1 thereto.

In a preferred embodiment, as shown in FIGS. 1(a) and 1(b), the receiving block 4 comprises a recess in which a housing mount 6 is affixed to a back surface of the recess in order to movably support a cylindrical lens housing 8 of the projection system 2 thereon. On a side of the receiving block 4 opposite to the recess, a clamp mount 10 with a frictional, screw clamp 12 (or other connection means such as a bayonet fitting) is provided having a cylindrical passage 14 which penetrates through the receiving block into the recess adapted to hold the projection system 12. The delivery fiber 1 is removably connected to the receiving block 4 by means of inserting the output end 7 of the fiber 1 through a ferrule 18, inserting the ferruled end of the fiber 1 through the cylindrical passage 14 and tightening the screw clamp 12 around the ferrule 18 to fixedly hold the fiber 1 in place. Preferably, the output end 7 of the delivery fiber 1 is further sheathed with a flexible jacket 20 that attaches to the back end of the ferrule 18 and surrounds a predetermined length of the fiber 1 to provide strain relief to the fiber 1. The jacket 20 is made from a resilient material, such as plastic or rubber, in order to reduce the bending that occurs at the fiber-to-illumination system connection so as to minimize the loss of light resulting from stress applied to the fiber at the bend. The receiving block 4 in addition to all of the other components of the surgical illumination system (except for the field lens and the delivery fiber) are preferably made from a lightweight metal such as aluminum, although it is envisioned that these components may also be suitably made from a sturdy plastic.

(1) Single Fiber Optic Delivery light guide: Visible light is delivered to the projection system through a single core optical fiber 1, which in the preferred embodiment, comprises a quartz core having a diameter of 0.48 mm, a cladding consisting of an amorphous fluorocarbon comprising a 1,3-DIOXOLE,4,5-DIFLUORO,2,2-BIS(TRIFLUOROMETHYL)-POLYMER with TETRAFLUOROETHENE, and a silicone buffer. The selection of this particular optical fiber provides a delivery light guide 1 having a numerical aperture of 0.68 which is equivalent to a solid angle of divergence of approximately 90°. Nonetheless,, any diameter of the above-specified fiber optic can be used, although the choice of its core diameter should depend upon the desired flexibility of the light guide I in addition to the amount of light required to be coupled to provide adequate illumination of the surgical working field. It was found desirable to utilize in the present invention fiber optics having a diameter not larger than 1.0 mm since optical fibers having larger diameters transmit a greater amount of light, but have a lower flexibility which decreases by the cube of the radius of the fiber.

Alternatively, any single core quartz fiber optic light guide 1 can be used, including polymer clad and quartz clad fibers. Since these fibers have smaller numerical apertures, the amount of light capable of being coupled into such fibers is accordingly reduced. Additionally, fibers consisting of other core materials such as borosilicate glasses and plastic can in principle be used to transmit light to the projection system 2 of the illumination system, but cannot be coupled directly into a high intensity light source (not shown) because of temperature considerations. These materials typically cannot withstand the high temperature created at the input end 5 of the delivery fiber 1, thereby causing the fiber 1 to melt. However, fibers made from borosilicate glass or plastic may be coupled at their input end 5 by means of a fiber-to-fiber coupling with a quartz core extension fiber connected at one end to the high intensity light source.

Because these single fiber delivery light guides 1 are significantly lighter than the fiber bundles used in the prior art for transmitting light from the source to the illumination system, such delivery fibers 1 provide the surgeon with substantially more freedom of movement due to the reduced weight for comparably or longer lengths of the delivery light guide 1. Additionally, since the light transmission loss is very low in single fiber delivery light guides 1 described above, the length of the delivery fiber 1 can be made much longer enabling the light source to be used remotely thereby minimizing interference with other surgical equipment. However, as will become apparent from the description below, the illumination system of the present invention is not limited solely to single fiber delivery light guides 1, but may also utilize fiber optic bundle delivery cables as long as the optical fibers of the bundle are few in number and each of the fibers comprises a small diameter.

With respect to the light source used in the preferred embodiment, the present invention comprises an off-axis, optical coupling system with a short-arc xenon lamp that enables a highly efficient coupling of light into the single fiber delivery light guide 1. This type of optical coupling system is exemplified by the one described in U.S. Pat. No. 4,757,431.

(2) Projection System: The projection system 2 of the present invention controls the angular divergence of the output light beam, and hence, the size of the resulting field of illumination. The solid angle of divergence of the light beam output from the projection system can either be fixed or adjustable to vary the size of the illumination field. Whereas the light emitted from the output end 7 of the fiber optic 1 itself can serve as the projection system 2, in practice it is preferable to have at least one imaging or non-imaging optical element coupled to the fiber's output end 7 so as to control the size and quality of the illumination field. In the preferred embodiment, the projection system 2 comprises a direct coupling of the light output from the delivery fiber 1 to a field lens 9 which projects the light beam at a particular angle of divergence onto the surgical working field. However, the particular type of lens or lenses used may include lens systems, lens arrays, graded index lenses and fresnel lenses. However, as would be obvious to one skilled in the art, the present invention may also comprise a compound coupling of light using either imaging optics (i.e., lenses) or non-imaging optics (e.g. light concentrators whether they be solid or hollow) disposed between the delivery fiber 1 and the field lens 9 (or even external to the projection system 2) as will be further discussed below. Additionally, it would be desirable in certain applications to utilize light polarizers and/or filters which control the polarization, the color or color temperature and/or the spectral distribution of the light.

As best shown in FIG. 1(b), the projection system 2 comprises a cylindrical housing mount 6 adapted with a centrally disposed cylindrical cavity 15 for receiving the ferruled, output end 7 of the delivery fiber 1 and for allowing the light output therefrom to initially diverge within the cavity 15 of the housing mount 6. An outside surface of the housing mount 6 is threaded for screwable reception of a correspondingly threaded, cylindrical lens housing 8. Alternatively, the surfaces of the housing mount 6 and the lens housing 8 may be made smooth (and/or adapted with ball bearings or a frictional slide mechanism) to permit the housing to slide back and forth on the housing mount. At a first end of the lens housing 8 opposite to the housing mount 6, a receptacle for the field lens 9 is formed by providing a seat for the lens 9. This is accomplished through the use of an annular flange 22 formed on the inner sidewall of the lens housing 8 (and/or a transparent plate 23 affixed to the inner sidewall) at depth within the cavity 15 equal to the thickness of the lens 9. To retain the field lens 9 within the seat of the housing 8, a lens cap 25 also having a cylindrical passage is provided with inner sidewall flanges 26 (and/or a transparent plate 24 affixed to its sidewall) formed at a planar endface of the lens cap 25 which forms the output aperture of the illumination system 27. Both the outer, cylindrical wall of the lens housing 8 and the inner, sidewall of the lens cap 25 are adapted with threads so that the lens cap 25 can be screwed onto the lens housing 8 to tightly retain the lens 9 between the first end of the housing 8 and the cap 25.

With this construction, the lens 9 is movable back and forth along the optical axis of the output end 7 of the delivery fiber 1 by screwing the lens housing 8 on and off of the housing mount 6. To prevent damage to and misalignment problems between the housing mount 6, the lens housing 8 and the lens 9, a first stop member 28 in the form of an annular flange is provided on the outer cylindrical wall of the lens housing 8 at a second end thereof opposite to its first end. As the housing 8 is screwed down onto the mount 6, the first stop member abuts the back surface of the receiving block 4 to stop further movement of the housing 8 toward the receiving block 4 (i.e., a closed or retracted position of the projection system 2). To prevent the lens housing 8 from becoming inadvertently detached from the housing mount 6, a second detachable stop member 29 in the form of a washer attached to the receiving block 4 by a screw is provided adjacent to the recess of the block 4. The washer 29 extends across a portion of the recess to a position proximate the lens housing 8 to prevent the first stop member 28 of housing 8 from exiting the recess when the housing 8 is being screwed off of the mount 6. When the stop members 28, 29 abut one another, the projection system 2 is in an open or protracted position.

In order to adjust the size of the illuminated field so as to correspond with the surgeon's field of view, the distance df between the output end 7 of the delivery fiber 1 and the lens 9 (shown in FIG. 4) is varied by screwing the lens housing 8 on and off of the housing mount 6. As shown in FIG. 1(c), the output end 7 of the delivery fiber 1 is fixedly positioned at an insertion point within the cavity of the housing mount defined by the point at which the entire solid angle of divergence of the light beam output from the fiber 1 fills the entire output endface of the field lens 9 when the system 2 is in the retracted position. In the retracted position, the size of the field of illumination projected on the surgical working area is at a maximum since the light exiting the output endface of the lens 9 is allowed to completely fill the solid angle of divergence of the particular delivery fiber 1 selected (i.e., the solid angle of divergence is matched with the numerical aperture of the field lens 9).

When the system 2 is moved to the protracted position where the distance df is at a maximum, the size of the field of illumination is at a minimum since not all the light exiting the delivery fiber 1 is initially incident upon the output endface of the field lens 9 (i.e., the solid angle of divergence is larger than the numerical aperture of the lens 9).

In prior art, adjustable-field illumination systems, an iris is used to produce smaller fields of illumination by absorbing the more divergent light rays while maintaining a constant light intensity of the beam. However, in the present invention, as the lens is moved to the protracted position, the collection efficiency of light in the housing is proportionately reduced but the total illuminated area is made much smaller due to the focusing power of the lens, thereby significantly increasing the overall light intensity of the smaller illuminated fields. Furthermore, in order to optimize this effect, the focal length of the field lens 9 is chosen to be approximately equivalent to the distance df when the lens 9 is in the protracted position. Hence, when the lens 9 is placed in the protracted (or "focused") position, the light source is imaged onto the surgical working field not only with maximum brightness, but also with maximum clarity.

Because the present invention combines the above-described projection system with a single fiber delivery light guide 1 which efficiently transmits light from a high intensity source to the surgical illumination system, the size and weight of the surgical illumination system is significantly reduced. Projection systems with movable lenses, to our knowledge, have not been utilized in the prior art due to the fact that the large diameters of the fiber optic bundles necessarily used in the prior art to provide sufficient light to the working field required the fiber-lens distance df be substantially large in order to achieve relatively small fields of illumination.

Small fields of illumination are desirable during surgical procedures due to the fact that surgeons normally view objects having sizes in the order of a few centimeters. During surgical procedures, the illuminated field should be kept as small as necessary in order to prevent thermal damage to tissues adjacent to the working area. Additionally, in order to view extremely narrow cavities, such as those in the ears and nose, it is necessary to illuminate the bottom of the cavity without illuminating the cavity walls or surrounding areas which will reflect the light to blur the surgeon's field of view. However, in order to accommodate a small field of illumination of 10 mm or less using the above-described projection system 2, it is necessary that a small diameter single fiber (or possibly fiber bundle) delivery light guide 1 also be utilized. This is because the use of large diameter delivery light guides require that the lens of the projection system traverse a distance df of approximately 11 to 13 centimeters. Obviously, a illumination system having a minimum size of 13 centimeters would be quite cumbersome and heavy for a surgeon to wear on his head and would substantially interfere with his viewing freedom.

Figure 4:
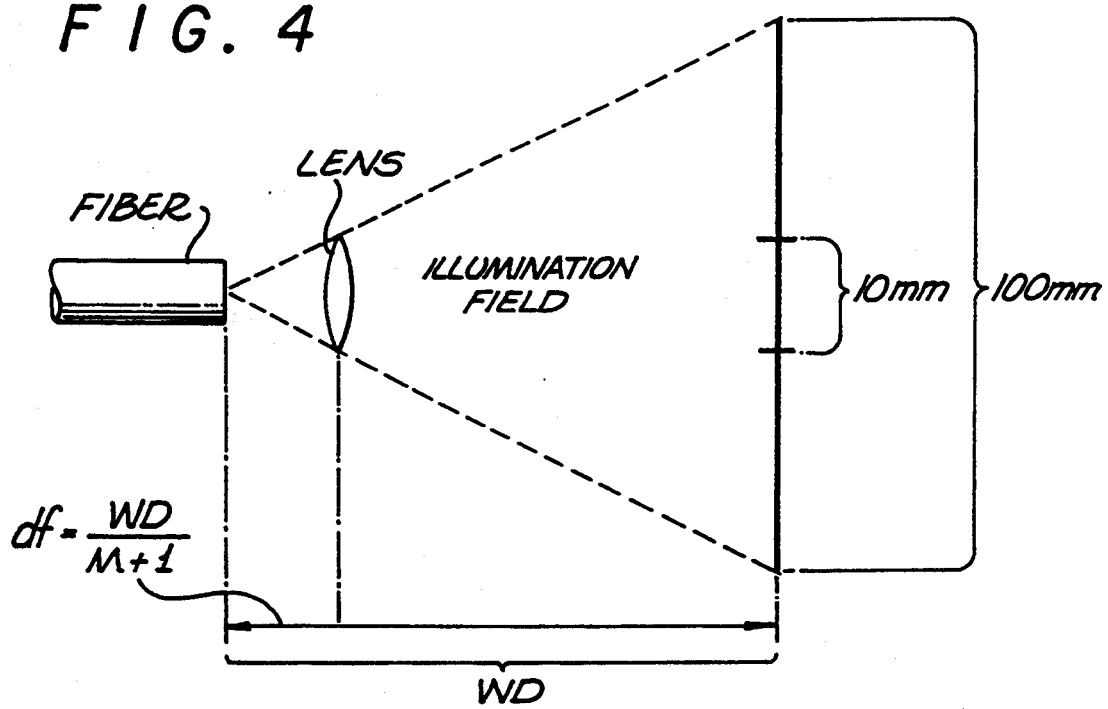
FIG. 4 is a side view of the light beam output from the surgical illumination system of the present invention, showing the interrelationships between the size of the illumination field, the fiber-to-lens distance df and the lens-to-illumination field distance di.

For example, with reference to FIG. 4, in the field of surgical illumination systems it is desired to produce an adjustable field of illumination having a diameter size ranging from a minimum of 10 mm to a maximum of 100 mm. In order to achieve this a minimum loss of light while utilizing a conventional delivery cable having a diameter of 5 mm with the projection system 2 of the present invention, the magnifying power M of the system 2 would have to range from between 2× and 20×.

Referring to FIG. 4, since the magnification M of a projection system 2 can be defined by the equation M=df/di, where df is the fiber-lens distance and di the lens-illuminated field distance, and the total working distance WD can be expressed as WD=df+di, we can solve for df by the following derivations:

$M=df/di, df=Mdi$ $WD=df+di, WD=df(M+1)$, or $df=WD/(M+1)$

Hence, with a minimum working distance WD defined in the industry as being 13 inches or 286 mm, we see that a projection system for a fiber bundle delivery cable would be required to have a distance df of at least 95.3 mm (i.e., df=286/3). Similarly, for a maximum working distance WD defined in the industry as being 18 inches or 396 mm, the system would have to have a distance df of at least 132 mm (i.e., df=396/3).

According the present invention, however, through use a single fiber delivery light guide 1 with a diameter of only 0.5 mm, which still has the capability of transmitting more than enough light to the working field, we see that the magnifying power M of the system advantageously ranges between 20× and 200×. Hence, the maximum distance df for a minimum working distance WD of 286 mm is only 1.4 mm or nearly 9× smaller than that required for a fiber bundle. Similarly, the maximum distance df for a maximum working distance WD of 396 mm is only 18.9 mm or 7× smaller that required when using a fiber bundle as the delivery light guide. Obviously this is of great importance in that the overall size in addition to the weight of the above-described projection system 2 can be made approximately 8× smaller by utilizing a small diameter delivery light guide 1.

Since this particular design creates a high efficiency of light transmission, smaller diameter beams are substantially brighter than larger diameter beams as is often required during visualization of the surgical field. This is particularly useful in two respects. As noted above, when viewing small, but deep cavities it is important that the illumination field not only have a very small diameter, but also that the brightness be maximized so as to facilitate visualization of objects deep within the cavity. More importantly, however, because the design of the projection system 2 produces a high power, concentrated light beam incident upon the field lens 9, lenses having rather large focal lengths can be utilized in the system 2 without significant attenuation of the over-all light power output from the illumination system. Hence, this enables designers to implement lenses which have a much greater magnifying capability that those which have been used in the past.

In comparison with prior art adjustable-field illumination systems, the illuminated field produced by the prior art devices is made variable through the use of an iris disposed between the delivery cable and the field lens. In order to reduce the size of the illuminated field, the diameter of the iris' aperture must be proportionately reduced, which in turn also attenuates the output light power of the system proportionate to the size of the illuminated field. Therefore, since the light power output from fiber bundle cables is already diminished by the significant light transmission loss per unit length of the cable, further attenuation of the light power at the iris required to achieve smaller illumination fields substantially inhibits adequate illumination of the working area when it is even possible to reach the desired illumination field size.

According to the present invention, in order to achieve a system 2 having an ideal magnification power M of approximately 20× so as to best range between an illuminated spot size of 10 mm and 100 mm at the minimum working distance WD of 286 mm, the ideal field lens would have a diameter of approximately 22 mm and a focal length of approximately 11 mm. Although these ideal characteristics produce a field lens 9 having superior light collection and illumination field size ranging capabilities, it was found that the quality of the illumination was lacking in both uniformity and clarity. Through further experimentation, however, it was determined that the selection of an achromatic field lens having a diameter of 10 mm and a focal length of 20 mm is preferred since it produces the best performance in terms of illumination quality while maintaining a rather small fiber-lens distance df that still provides the same ranging capability for the size of the illumination field. For instance, with a given working distance WD of 286 mm, the minimum distance df for an image size of 100 mm would be 11 mm, whereas the maximum distance df for an image size of 10 mm would be 18 mm. Yet it was found that field lenses having a diameter in the range of 1 mm to 22 mm and a focal length in the range of 1 mm to 20 mm produced adequate performance with respect to the quality and uniformity of the illuminated field. Hence, with the implementation of a screwable or slidable lensing system that further minimizes the total length of the projection system 2, the projection system 2 of the present invention can be implemented as shown in FIG. 1(b) with a length of approximately 32 mm.

Figure 5A:
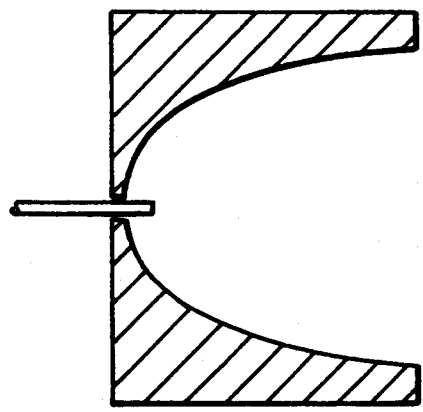
FIG. 5(a) is a cross-sectional view of a compound parabolic concentrator to be implemented in the projection system of the present invention.
Figure 5B:
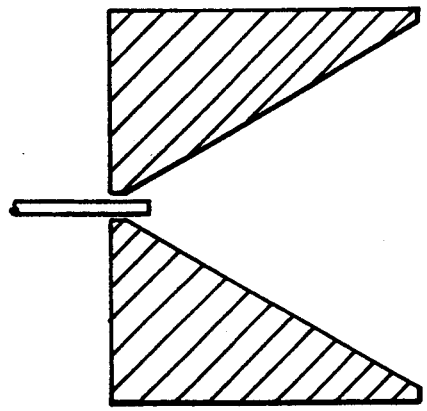
FIG. 5(b) is a cross-sectional view of a compound conical concentrator to be implemented in the projection system of the present invention.
Figure 5C:
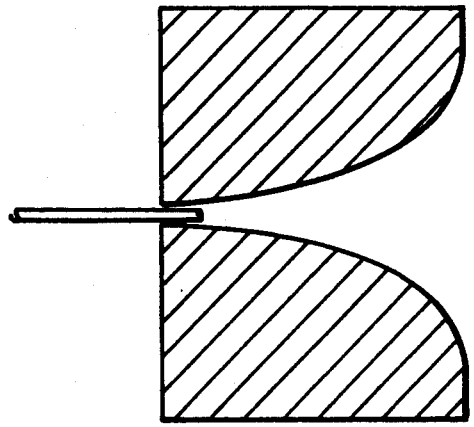
FIG. 5(c) is a cross-sectional view of a compound trumpet-shaped concentrator to be implemented in the projection system of the present invention.

As alternative embodiments of the above-described projection system, the following improvements are suggested. Various optics can be implemented within the cavity 15 defined by the housing mount 6 so as to better collect and concentrate the light rays exiting the output end 7 of the single delivery fiber 1. In one implementation, these optics may comprise imaging optics (i.e., lenses) such as a condenser lens system or the like. In another implementation, non-imaging optics, such as concave parabolic or elliptical concentrators (FIG. 5(a)), conical-shaped concentrators (FIG. 5(b)), trumpet-shaped concentrators (FIG. 5(c)) and the like can be utilized to change the effective numerical aperture of the light exiting the output end 7 of the delivery fiber 1. In combination of both imaging and non-imaging optics, the light exiting a selected non-imaging optic may further be transmitted through a collimating lens so as to collimate the light output from the illumination system. Furthermore, polarizers and filters may be implemented between the delivery fiber 1 and the lens 9 for use in particular applications.

Furthermore, for particular applications, the use of an adjustable aperture, such as an iris, either at the input end 5 or output end 7 of the delivery fiber 1 would enable the size of the illuminated field to be adjusted proportionate to the diameter of the aperture. An aperture placed at the output end 7 would provide a constant light level, which may, however, be insufficient for illuminated spots of small diameters. An aperture at the input end 5 would cause a change in the beam diameter by changing the numerical aperture of light entering the delivery fiber 1, which for short lengths of fiber, would proportionately change the solid divergence angle at the fiber's output end 7.

(3) Mounting Mechanism: In the preferred embodiment, shown in FIGS. 1(a) and 1(b), the mounting mechanism 3 of the present invention comprises a ball and socket joint 30 coupled to a lower corner of a generally rectangular receiving block 4 by means of a rigid post 32 affixed therebetween. The ball 31 is spring loaded into the socket of the joint receptacle so as to produce resistance against movement of the ball 31. The aperture of the socket is formed by a solid angle of rotation (of nearly 180°) which delineates the range of movement capable by the post 32, and hence, of the surgical illumination system. Attachment of a joystick 35, either fixed or removable (for sterilization), enables control of the exact position of the illumination system so as to properly position the output light beam. As shown in FIGS. 1(a) and 3(a) and 3(b), the ball and socket joint 30 is preferably affixed to a bracket 36 (having a base 37) which can easily be attached to an annular head mount 38 for insertion of the annular head mount 38 into a headband 40 worn by the surgeon. Alternatively, the ball and socket joint 30 may be affixed to a clip or clamping device 42 (FIG. 1(d)) which can then be clamped to a receiving bracket affixed to the annular head mount 38, to a pair of eyeglass frames, to the mounting post of a pair of surgical loupes, or to a goose-neck fixture which permits adjustment of the illumination systems general position. The use of such a clip or clamping device 42 is advantageous in that the illumination system can be attached to some structure distant from the surgeon. However, when worn proximate to the surgeon's head, rotation of the system about the ball and socket joint enables generally coaxial alignment with surgical loupes or spectacles 50 worn by the surgeon or simply coaxial alignment with his field of view.

In an alternative embodiment of the mounting mechanism 3 of the present invention, the receiving block 4 may take on various shapes and positions in order to minimize bending of the delivery fiber 1 at its connection to the receiving block 4 and/or to provide a coaxial arrangement between the surgeon's field of view and the field of illumination. The receiving block 4 shown FIG. 1(a) takes advantage of the "above-the-head" positioning of the illumination system by utilizing a rather small receiving block 4 of a generally rectangular shape. In addition, the screw clamp (or bayonet fixture) 12 of this receiving block 4 can be positioned on the back of the block 4 so that the delivery fiber 1 need not be bent in order to attach it to the block 4.

As shown in FIGS. 3(a) and 3(b), the receiving block 4 comprises a "stepped"-shaped body wherein the input aperture and screw clamp 12 are positioned at the top of the block 4. In this manner, more room is provided for coupling of the delivery fiber 1 to the block 4 and to prevent significant bending of the fiber 1 since the surgeon's forehead does not interfere with the coupling. More importantly, however, this configuration of the receiving block 4 permits the post 32 of the mounting mechanism 3 to be affixed to the block 4 at a higher position such that the projection system is lowered and made coincident with the line of sight of the surgeon (FIG. 3(b)). Therefore, the relatively small structure of the illumination system can be placed between the surgeon's eyes to produce a field of illumination coaxial with the surgeon's field of view without interfering with his sight.

With the use of the "stepped"-shaped receiving block 4, the portion of the delivery fiber 1 proximate to its output end 7 must undergo a bend of approximately 90° in order to be properly inserted within the cavity 15 of the housing mount 6. If this type of connection were attempted with a normal fiber bundle delivery cable, the stress exerted on the cable at the bend would cause an incredibly large loss of light output from the cable. However, for single fiber delivery light guides 1 of small diameters (i.e., approximately 0.5 mm), a significant bend such as this causes only a small amount of light to be lost in transmission, thereby enabling the illumination system to be posited closer to the surgeons forehead than has been done in the prior art.

In order to facilitate the connection of the delivery fiber 1 to the housing mount 6 through the 90° angle, the present invention further discloses in an alternative embodiment the use of a short extension fiber 45 that can be properly positioned inside the receiving block 4 by a technician at the factory. Such an extension fiber 20 can be of the same material and specifications or of a different material (for example, borosilicate or plastic) and/or of the same or different specifications as the light delivery fiber 1. The output end 46 of the extension fiber 45 is slid in place within the cavity 15 of the housing mount 6, while that portion of the extension fiber 45 extending from the top of the block 4 is tightly clamped so as to maintain proper alignment of its output end 46 with the field lens 9. The input end 47 of the extension fiber 45 is then adapted with a fiber-to-fiber coupling 48 for reception of the output end 7 of the delivery fiber 1. In this way, proper alignment between the extension fiber 45 and the field lens 9 can be maintained during attachment and detachment of the delivery fiber 2 to the surgical illumination system.

In summary, the advantages of the surgical illumination system of the present invention are both optical and functional. The optical advantages include the production of a uniformly illuminated field at all beam diameters. Because of the minimal loss of transmitted light, the efficiency is high and the amount of heat generated at the achromatic lens 9 is negligible. Fibers of varying diameter permit the maximum amount of light transmitted to be chosen without adding any significant weight to the overall illumination system. The functional advantages include miniaturization of the illumination system assembly as compared to all prior art illumination systems with the attendant advantages of minimal weight and minimal discomfort during long periods of use. Moreover, because of the high intensity of light able to be transmitted through a single fiber and the efficient direct coupling to a lens, the total intensity, overall quality and uniformity of the light output from the illumination system are superior. Given the small size of the fiber, simple and efficient projection systems are possible. The high intensity also enables polarized or filtered light to be used for specialized viewing. Moreover, the miniaturized design enables a variety of mounting systems to be employed that facilitates greater versatility in designing surgical illumination systems that are less obtrusive to the surgeon and that can be placed in a coaxial arrangement with the surgeon's field of view.

While the invention has been described in conjunction with the preferred embodiment, it is evident that numerous alternatives, depictions, variations and uses will be apparent to those skilled in the art in light of the foregoing description. Thus, it is understood that the invention is not to be limited by the foregoing illustrative details, but rather is to be defined by the appended claims.

What is claimed is:

1. A light projection system for a surgical illumination system which provides an adjustable field of illumination incident upon a working area during surgical procedures, the light projection system comprising:

a first housing member comprising a first end having a substantially cylindrical cavity with a central axis formed in the first end perpendicular to the first end, the first housing member also comprising a second end having a wall with a hollow connector mounted in the wall along the central axis of the cylindrical cavity for receiving a single fiber optic having an output end inserted through the wall into the cylindrical cavity of the first end;

a second housing member comprising a first end and a second end with a generally cylindrical passage passing through the first end to the second end of the second housing member, the second end of the second housing member movably engaged with the first end of the first housing member to enable relative movement between the first and second housing members along the central axis of the cylindrical cavity; and a single lens having an output endface mounted in the cylindrical passage at the first end of the second housing member for transmission of light received from the output end of the single fiber optic onto the working area, the relative movement between the first and second housing members enabling the single lens to provide a uniform illumination on the working area over a range of continuously adjustable spot sizes by movement between a retracted position where the second end of the first housing member is adjacent to the second end of the second housing member and a protracted position where the first end of the first housing member is adjacent to the second end of the second housing member;

wherein the output end of the single fiber optic is disposed within the cylindrical cavity of the first housing member at an insertion point defined by a point along the central axis of the cylindrical cavity at which an entire solid angle of divergence of the light output from the output end of the single fiber optic fills the entire output endface of the lens when the first and second housing members are in the retracted position.

2. The projection system of claim 1, wherein the first housing member comprises a substantially cylindrical outer wall surrounding the cylindrical cavity of the first housing member and being adapted to fit within the cylindrical passage of the second housing member, the second housing member having a substantially cylindrical inner wall defined by the cylindrical passage of the second housing member, the cylindrical outer wall and the cylindrical inner wall having means for moving the second housing member back and forth on the first housing member to move the single lens between the retracted and protracted positions.

3. The projection system of claim 1, wherein the single fiber optic comprises a quartz core with a diameter not greater than 1.0 mm and a numerical aperture greater than 0.55.

4. The projection system of claim 3 wherein the single fiber optic comprises an input end optically coupled to a short-arc xenon lamp through an off-axis, optical coupling system.

5. The projection system of claim 1, wherein a concentrator comprising a reflector having a reflective surface, an optical axis and an input aperture disposed along the optical axis is positioned within one of the cylindrical cavities of the first housing member and the cylindrical passage of the second housing member with the optical axis of the reflector of the concentrator and the central axis of the cylindrical cavity of the first housing member being substantially coincident, and with the output end of the single fiber optic passing through the input aperture of the reflector to enable light output from the single fiber optic to be collected and concentrated by the reflective surface of the reflector of the concentrator and reflected towards the single lens.

6. The projection system of claim 5, wherein the reflector comprises a reflector selected from the group consisting of a concave parabolic concentrator, a concave elliptical concentrator, a conical-shaped concentrator and a trumpet-shaped concentrator.

7. The projection system of claim 1, wherein the projection system further comprises an iris having an adjustable aperture disposed between the output end of the single fiber optic and the lens perpendicular to the central axis of the cylindrical cavity of the first housing member thereby enabling the size of the field of illumination incident upon the working area to be adjusted by opening and closing of the adjustable aperture of the iris.

8. The projection system of claim 1, wherein the lens comprises an achromatic field lens having a diameter between 1.0 mm and 40 mm and a focal length between 1.0 mm and 22 mm.

9. The projection system of claim 4, wherein the lens comprises one of an achromatic field lens having a diameter of approximately 10 mm and a focal length of approximately 20 mm and an achromatic field lens having a diameter of approximately 22 mm and a focal length of approximately 11 mm.

10. A surgical headlamp worn on the head of a surgeon during surgical procedures for providing an adjustable field of illumination incident upon a working area, the surgical headlamp comprising:
 a single fiber optic having an output end for transmitting light from a light source to the surgical headlamp;
 a light projection system comprising
  a first hollow housing member having a first open end and a second end having a wall with a hollow connector mounted in the wall for receiving the output end of the single fiber optic,
  a second hollow housing member having a first end and a second open end with a central passage between the first end and the second end of the second housing member, the passage having a size sufficiently large for insertion of the first housing member within the passage of the second housing member to enable relative movement of the first housing member back and forth within the central passage, and
  a single lens having an output endface mounted within the central passage at the first end of the second housing member for transmission of light received from the output end of the single fiber optic onto the working area; and
 a mounting mechanism for the projection system comprising
  a bracket,
  a stretchable headband having a means for supporting the bracket,
  a base attached to the bracket supported from the headband,
  a joint receptacle having a first end connected to the base of the mounting mechanism and a second end adapted with a socket for receiving and retaining a ball rotatable in place within the socket, and
  a post having a first end connected to the ball within the socket of the joint receptacle and a second end coupled to the first housing member of the light projection system to enable pivotal movement of the light projection system about the head of the surgeon.

11. The surgical headlamp of claim 10, wherein the mounting mechanism further comprises a receiving block having a first side formed with a recess for mounting of the first housing member within the recess and a second side opposite the first side of the receiving block for connection of the post to the second side, the hollow connector of the first housing member passing through the receiving block to permit passage of the single fiber optic through the receiving block and into the first housing member.

12. The surgical headlamp of claim 11, wherein the receiving block further comprises a top end for positioning proximate to the forehead of the surgeon and a bottom end for positioning between the eyes of the surgeon, with the hollow connector passing through the receiving block exiting the receiving block proximate to the top end, and with the recess formed in the first side disposed proximate to the bottom end and with the direction of light output from the projection system adjustable by movement of the receiving block relative to the joint receptacle to make the field of illumination formed by the output light incident upon the working area approximately coaxial with the field of view of the surgeon.

13. The surgical headlamp of claim 10, wherein the first housing member comprises a substantially cylindrical outer wall forming a cylindrical cavity having a central axis within the first housing member, the second housing member having a substantially cylindrical inner wall defined by the central passage of the second housing member, the cylindrical outer wall and the cylindrical inner wall having means for moving the second housing member back and forth on the first housing member to move the lens between retracted and protracted positions.

14. The surgical headlamp of claim 13, wherein the single fiber optic has its output end disposed within the cylindrical cavity of the first housing member at an insertion point defined by a point along the central axis of the cylindrical cavity at which an entire solid angle of divergence of the light output from the output end of the single fiber optic fills the entire output endface of the lens when the system is in the retracted position.

15. The surgical headlamp of claim 10, wherein the single fiber optic has a quartz core with a diameter not greater than 1.0 mm and an NA greater than 0.55.

16. The surgical headlamp of claim 15, wherein the single fiber optic comprises an input end optically coupled to a short-arc xenon lamp through an off-axis, optical coupling system.

17. The surgical headlamp of claim 10, wherein a concentrator comprising a reflector having a reflective surface, an optical axis and an input aperture disposed along the optical axis is positioned within one of the first housing member and the second housing member, with the output end of the single fiber optic passing through the input aperture of the reflector of the concentrator to enable light output from the single fiber optic to be collected and concentrated by the reflective surface of the reflector of the concentrator and reflected towards the lens.

18. The surgical headlamp of claim 17, wherein the reflector comprises a reflector selected from the group consisting of a concave parabolic concentrator, a concave elliptical concentrator, a conical-shaped concentrator and a trumpet-shaped concentrator.

19. The surgical headlamp of claim 10, wherein the projection system further comprises an iris having an adjustable aperture disposed between the output end of the single fiber optic and the lens enabling the size of the field of illumination incident upon the working area to be adjusted by opening and closing of the adjustable aperture of the iris.

20. The surgical headlamp of claim 10, wherein the lens comprises an achromatic field lens having a diameter between 1.0 mm and 40 mm and a focal length between 1.0 mm and 22 mm.

21. The surgical headlamp of claim 16, wherein the lens comprises one of an achromatic field lens having a diameter of approximately 10 mm and a focal length of approximately 20 mm and an achromatic field lens having a diameter of approximately 22 mm and a focal length of approximately 11 mm.

22. The surgical headlamp of claim 10, wherein the lens comprises a condenser lens assembly.

23. The projection system of claim 2, wherein the means for moving the second housing member back and forth on the first housing member comprises one of corresponding threads formed on the cylindrical inner wall and the cylindrical outer wall for screwing the second housing member on the first housing member and a slide means for sliding the second housing member back and forth on the first housing member.

24. The projection system of claim 1, wherein the projection system further comprises a mounting mechanism for attaching the projection system to one of a plurality of objects, the mounting mechanism comprising a base connected to the second end of the first housing member and a clamp connected to the base.

25. The projection system of claim 13, wherein the means for moving the second housing member back and forth on the first housing member comprises one of corresponding threads formed on the cylindrical inner wall and the cylindrical outer wall for screwing the second housing member on the first housing member and a slide means for sliding the second housing member back and forth on the first housing member.

* * * * *